May 9, 1950 D. H. RANSOM 2,506,613

MULTIDIGIT ALL-ELECTRONIC SWITCHING SYSTEM

Filed Feb. 7, 1946 5 Sheets-Sheet 1

INVENTOR.
DAVID H. RANSOM

BY

R P Morris
ATTORNEY

May 9, 1950 D. H. RANSOM 2,506,613

MULTIDIGIT ALL-ELECTRONIC SWITCHING SYSTEM

Filed Feb. 7, 1946 5 Sheets-Sheet 2

INVENTOR.
DAVID H. RANSOM

BY

R P Morris
ATTORNEY

INVENTOR.
DAVID H. RANSOM
BY
R P Morris
ATTORNEY

MULTIDIGIT ALL-ELECTRONIC SWITCHING SYSTEM

Filed Feb. 7, 1946 5 Sheets-Sheet 4

INVENTOR.
DAVID H. RANSOM

BY

R P Morris
ATTORNEY

May 9, 1950 D. H. RANSOM 2,506,613

MULTIDIGIT ALL-ELECTRONIC SWITCHING SYSTEM

Filed Feb. 7, 1946 5 Sheets-Sheet 5

INVENTOR.
DAVID H. RANSOM

BY

R P Morris
ATTORNEY

Patented May 9, 1950 2,506,613

UNITED STATES PATENT OFFICE 2,506,613

MULTIDIGIT ALL-ELECTRONIC SWITCHING SYSTEM

David H. Ransom, Montclair, N. J., assignor to Federal Telecommunication Laboratories, Inc., New York, N. Y., a corporation of Delaware Application February 7, 1946, Serial No. 646,169

18 Claims. (Cl. 179—18)

This invention relates to new and useful improvements in communication systems and more particularly in electronic switching arrangements for communication systems such as telephone exchanges.

The object of the present invention is to provide electronic means for controlling switching operations by a plurality of series of pulses representing, for instance, a plurality of successive digits of a line number.

A further object of the invention is to perform by means of an electronic switch substantially the same kinds of switching operations as can be performed by means of an electromechanical multi-point switch.

These and other objects of the invention will more clearly appear from the following detailed description of certain embodiments thereof and the appended claims.

Figure 1:
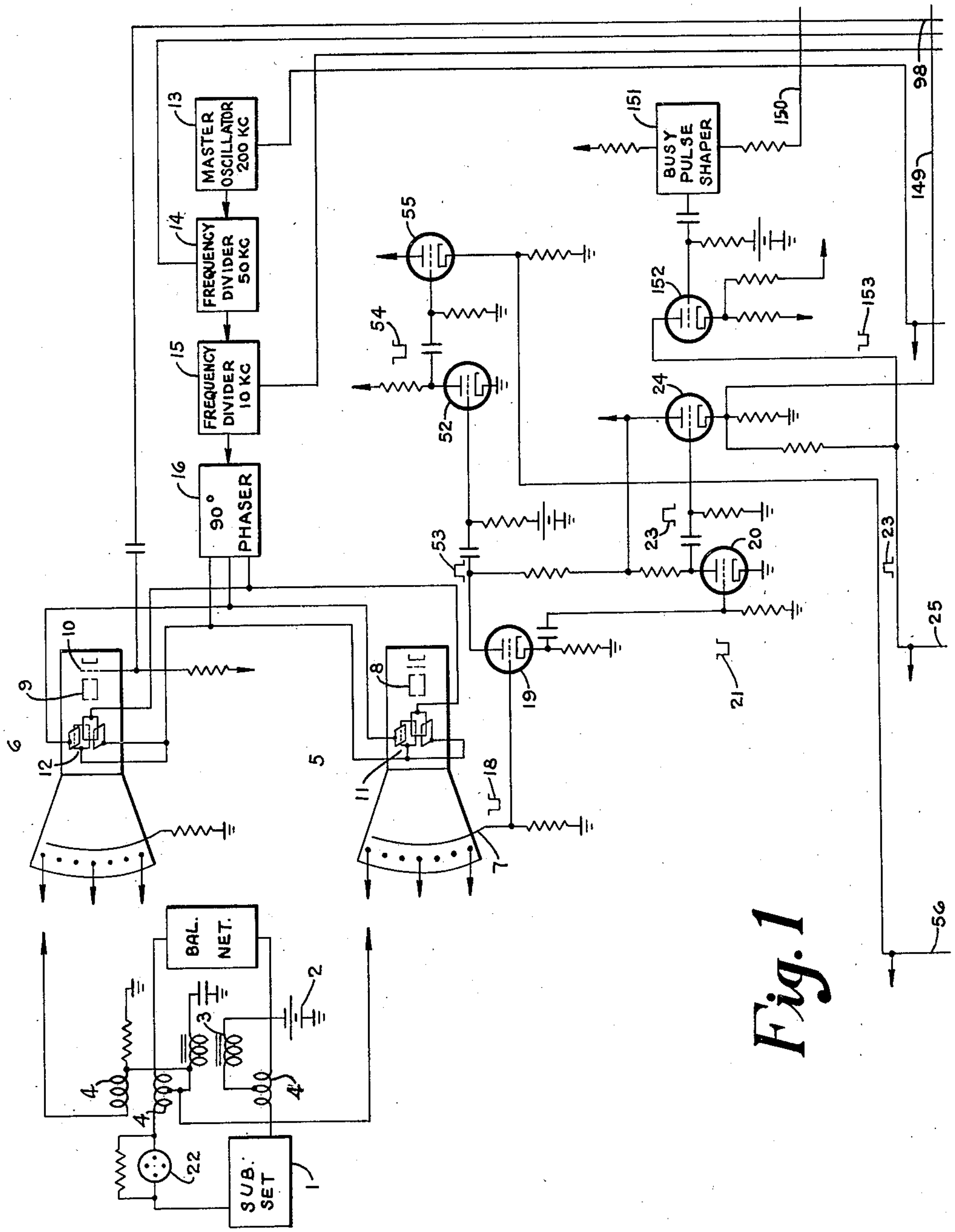
Figure 2:
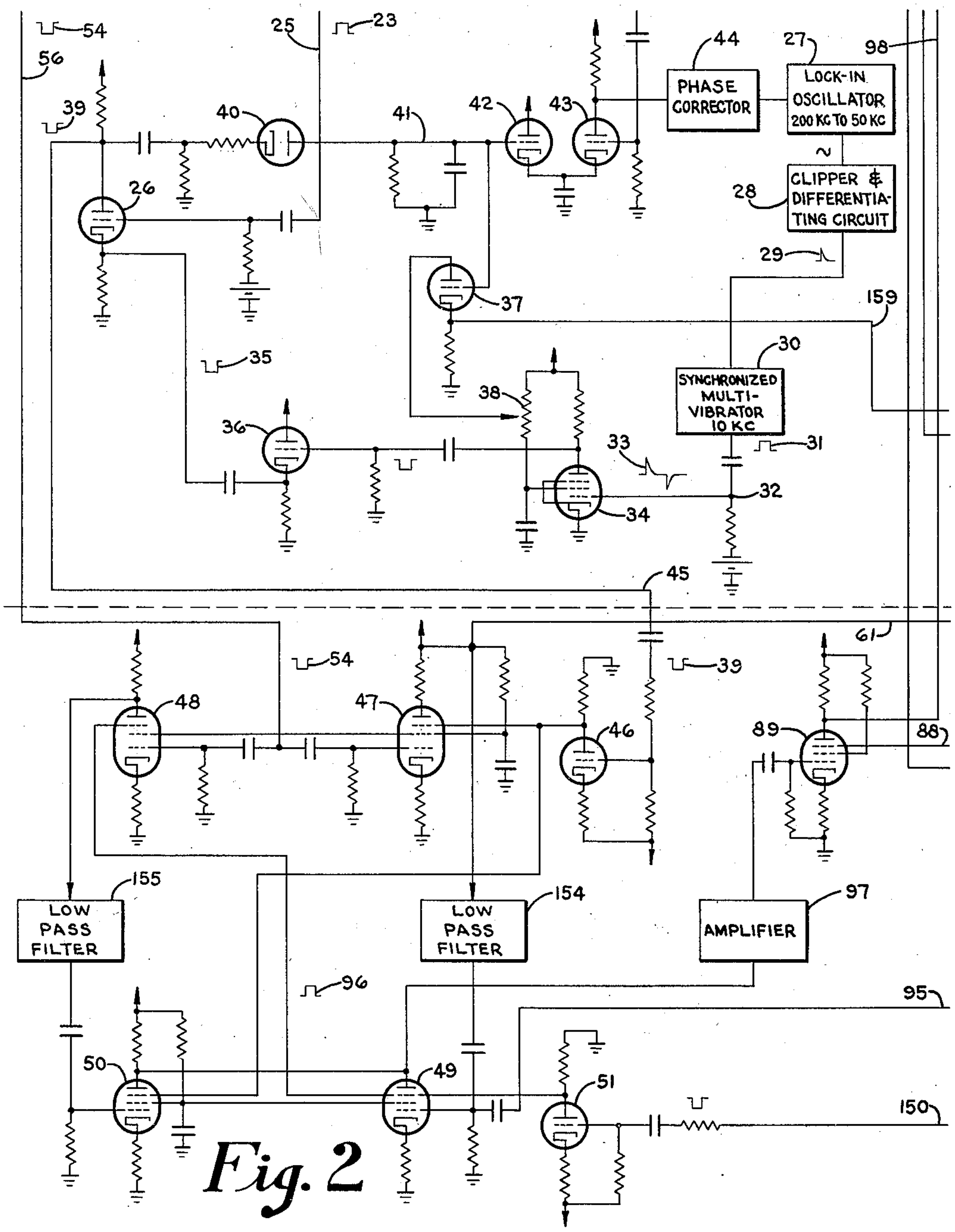

In the drawings, Figs. 1–4 diagrammatically illustrate a telephone system; Fig. 1 showing the subscriber's line and common distributing equipment, Fig. 2 the line finder equipment and the talking circuit, Fig. 3 the line selecting and registering equipment, and Fig. 4 the dial pulse and ringing equipment.

Figure 6:
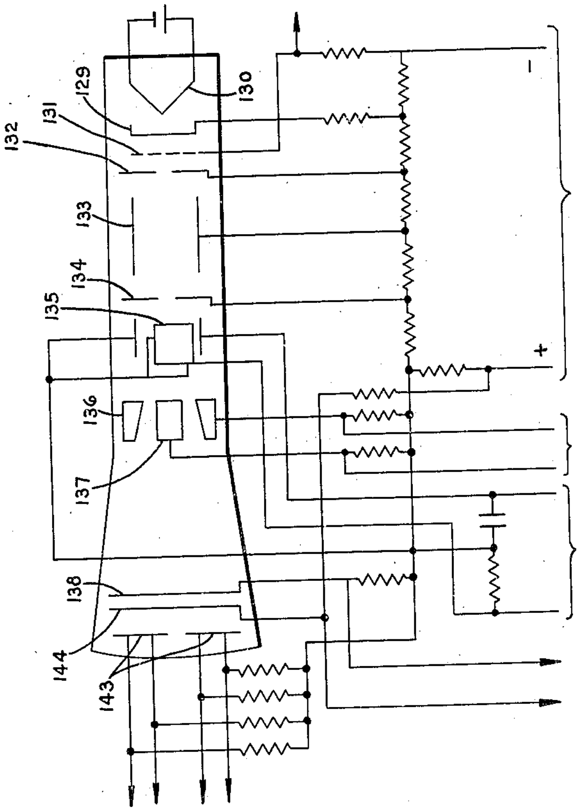
Figure 5:
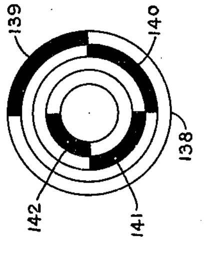

Fig. 5 is a diagrammatic representation of a second type of electronic switch that may be used in the system, and Fig. 6 is a plan view of the screen used in said switch.

When a call is initiated at the substation 1 of one of the lines a negative potential is applied from battery 2 over a choke coil 3, a winding of a hybrid coil 4 associated with the line, and the subset to the top dynode which is assumed to bear designation #0 of a receiving distributor 5 which, together with a sending distributor 6, is provided in common for a plurality of groups of subscribers' lines which terminate in the dynodes. In the system here disclosed it is assumed that there are twenty lines divided into five groups. Any other number of lines may be provided in any other grouping.

Distributors 5 and 6 are cathode ray tubes provided with the customary electron gun structures 8 and 9, the dynode terminals of the lines and anodes, like 7, for collecting the secondary emissions of the dynodes. Only the control grid 10 of the sending tube 6 is utilized in the present case. The tubes are provided with deflecting means, such as plates 11 and 12, respectively, which are fed in multiple from a 200-kc. master oscillator 13 connected with the deflecting plates over a 50-kc. frequency divider 14 and a 10-kc. frequency divider 15, and a 90° phase shifter 16.

Whenever the beam of cathode ray tube 5 engages the dynode #0 of the calling line, electrons will flow from the dynode to anode 7 of this tube and, therefore, a negative pulse 18 will be applied to the grid of cathode follower and inverter 19. The negative pulse in the cathode output of triode 19 is fed to the grid of clipper amplifier 20 which is normally biased to draw current. The amplitude of the negative pulse 21 fed to the grid of this amplifier is so adjusted that it will drive the tube 20 beyond cut-off so that it will clip modulations by the transmitter at substation 1 or by pulses produced by dial 22 in the calling subscriber's line. The plate output of clipper 20 consists of positive pulses 23 fed to the grid of cathode follower 24 and through the cathode thereof to conductor 25 which is multipled to the grids of all the line finder gate tubes like 26 provided in the links through which calling and called lines may be interconnected.

The line finder gate 26 is normally biased far enough beyond cut-off so that the incoming signal 23 will not affect its plate output.

The line finder is provided with a lock-in oscillator 27 which operates at a frequency slightly less than that of the master oscillator 13, and divides this output to a frequency of approximately 50 kc. which is passed through a clipper and differentiating circuit 28 in the form of a sharp positive pulse 29 to a multi-vibrator 30 arranged to synchronize at approximately 10 kc. The square wave pulses 31 which appear in the output of 30 are differentiated in a network 32 and appear as pulses 33 in the control grid of clipper gate 34. The constants and bias of gate 34 are so adjusted as to produce by the leading edge of pulses 33 in the plate of 34 a short square negative pulse 35 of approximately five microseconds duration. The trailing edge of pulse 33 is suppressed. The pulse is passed through, as 35, the cathode of a cathode follower 36, to the cathode of the line finder gate 26. The amplitude of pulse 35 is so adjusted by a delay gain tube 37 that normally the line finder gate 26 is not driven beyond cut-off by the positive pulses 23 applied to its control grid. Since the frequency of the line finder lock-in oscillator 27 is slightly less than that of the master oscillator 13, the incoming pulses 23 and the local pulses 35 applied to the line finder gate will drift in time until they occur simultaneously, whereupon a negative pulse 39 will be produced in the plate circuit of the line finder gate 26.

Pulse 39 will be passed through a rectifier 40 and an integrating net 41 to the grid of a gate control tube 42 to drive it beyond cut-off, whereupon a lock-in gate 43 will pass the signal to the lock-in oscillator 27, synchronizing the latter with the master oscillator 13. A phase corrector 44 is provided between gate 43 and the oscillator 27 to permit accurate adjustment.

A portion of the output of rectifier 40 is fed to the control grid of the delayed gain tube 37 and will drive it beyond cut-off after a few pulses. The plate resistor 38 of the delayed gain tube is connected with the screen grid of clipper gate 34. The voltage on this screen will rise and, therefore, increase the amplitude of the pulse 35, which is applied to the cathode of the line finder gate as a pedestal pulse. The grid of gate 26 will be driven positive by the incoming pulse 23, and clipping by grid current will occur.

The plate output 39 of the line finder gate is also applied over a conductor 45 to the control grid of an input gate control tube 46. The talking circuit has two input gate tubes 47, 48, and two output gate tubes 49, 50 jointly controlled by the input control 46 and the output control tube 51. The gate tubes are normally biased to cut-off on their suppressor grids which are connected in pairs to the plate resistors of the input and output control tubes; those of gates 47 and 50 to control tube 46 and those of gates 48 and 49 to output gate control 51. The negative pulse 39 drives the grid of gate control 46 beyond cut-off which reduces the voltage drop across its plate resistor to zero. This will raise the bias on the suppressor grids of 47 and 50, and permits signals to pass which may appear on the control grids of these gates.

Returning now to the common circuit affected by the initiation of a call, it is assumed that speech and dial pulses will modulate the line signal 18 25%. The clipping action of triode 20 will cut off the modulated portion so that the pulses 23 applied to the line finder gates 26 will be uniform. However, a clipper tube 52 to which positive pulses 53 appearing in the plate output of inverter 19 are applied is biased so that only the modulated portion of the pulse 53 will appear as negative pulses 54 in its plate circuit. Pulses 54 are applied to the grid of cathode follower 55 and are transmitted over conductor 56 to the control grids of the input gates 47, 48 of all the links.

Normally a series of negative pulses 54 will be passed by the input gate 47 to the dial pulse circuit over conductor 61 before the subscriber starts dialing. The selective action of the input clipper tube 52 will interrupt these pulses with each pulse produced by the calling subscriber's dial 22. A low pass filter in the grid of amplifier tube 60 to which the output circuit of gate 47 is connected over conductor 61 forms positive pulses 62 appearing therein into low frequency pulses which, after amplification, are integrated at 63 and shaped in clipper tubes 64 and 65 to form square wave negative pulses 66. The pulses 66 are differentiated in a network 67 into pulses 68 which are applied to the control grid of a unit dialing gate 69 and in multiple therewith over conductor 70 to the control grid of a group dialing gate tube 71.

The calling subscriber dials two digits; the first representing the group or tens designation and the second the units designation of the called line.

Figure 3:
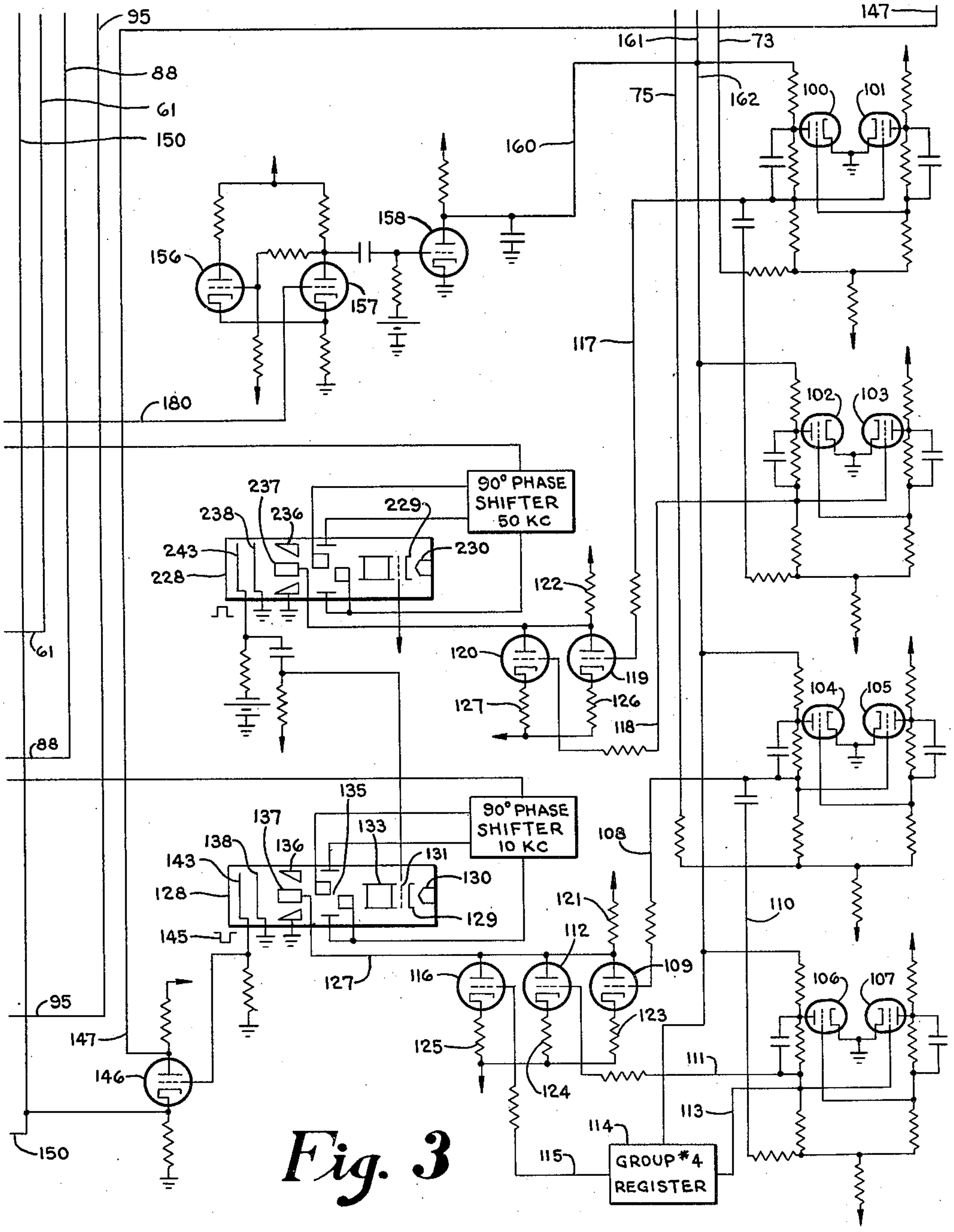
Figure 4:
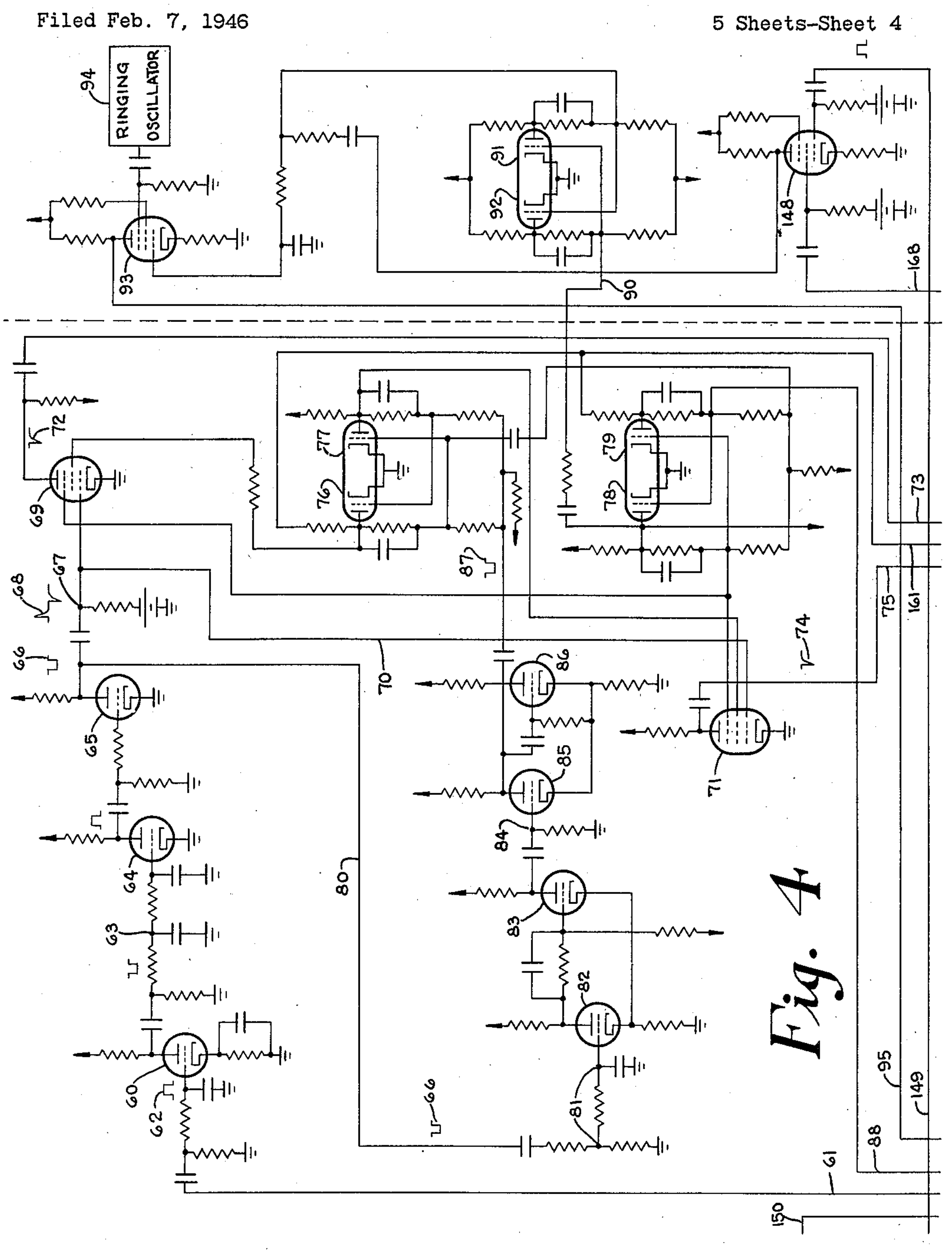

The bias of the unit and group dialing gates 69, 71 is so adjusted that the leading edge of pulse 68 is suppressed and the trailing edge passed as a negative pulse 72 from the plate of unit dial gate 69 over conductor 73 to the units register circuit (Fig. 3), and as negative pulse 74 appearing in the plate of group dial gate 71 over conductor 75 to the group register circuit (Fig. 3). The pulses 72 and 74 are passed only when the screen grids of the unit and group dial gates are positively biased.

Triode 76 of an Eccles-Jordan group digit trigger circuit is normally conducting and biases the screen grid of unit gate 69 near zero and the screen grid of grid dial gate 71 at positive potential. The suppressor grids of the two dial gate tubes 69 and 71 are connected in multiple and held at zero bias by the units digit trigger circuit comprising tubes 78 and 79, with the latter normally conducting.

The grid dial gate 71 will, therefore, pass the first series of dial pulses to set the group register in accordance with the group or tens designation of the called line.

When the dialing of the first digit is completed, the control is transferred to permit the dialing of the second digit. This is accomplished by feeding a portion of the output of clipper amplifier 65 over a conductor 80 and an integrating net 81 to the grid of a normally conducting tube 82 which, together with a triode 83, constitutes a digit pulse flip-flop circuit. The first pulse 66 of a train will transfer conduction from 82 to 83 and the circuit constants will maintain this condition until the end of a series of pulses, whereupon 82 will again become conducting.

At the end of the first series of dial pulses when 83 is again cut-off, a positive pulse will be sent from its plate over a differentiating circuit 84 to a digit control flip-flop circuit comprising tubes 85 and 86, the latter normally conducting. The pulse will transfer conduction to tube 85 for a period of time determined by the constants of the circuit and a negative pulse 87 will be sent to the group digit control tubes to transfer conduction from tube 76 to 77.

The screen grids of the two dial gate tubes 69 and 71 being connected to the plates of 76 and 77, respectively, first, as above described, only the group dial gate 71 and then only the unit dial gate 69.

These gates will in turn pass first the pulses 74 to the group registers and then the pulses 72 to the unit register.

After the dialing of the second or units digit, a negative pulse 87 sent from the digit control 85, 86 will flip the group digit gate so that 76 will again become conductive and will send out a pulse to the units digit control 78, 79 to transfer conduction from 79 to 78. Tube 78 will now bias the suppressor grids of both dial gates 69 and 71 to cut-off to prevent transients from affecting the setting of the registers.

The tube 78 will apply also a bias over conductor 88 to the suppressor grid of an output gate tube 89 to permit the passage of a ringing signal, as will be explained below.

A negative pulse is sent from the plate of 78 over a conductor 90 to a ringing control trigger circuit comprising triodes 91 and 92, with the former normally conducting. The ringing control circuit contains also a ringing gate 93 which is biased to cut-off until the completion of the dialing when, as above stated, through the agency of the units digit trigger circuit the ringing control tube 91 is made conductive. This will so bias the control grid of the ringing gate 93 as to make it conductive. Ringing current generated by an oscillator 94 modulates the suppressor grid of the gate 93 and produces pulses in the plate of the gate 93 which are applied over a conductor 95 to the control grid of the output gate 49. Whenever the output gate is functioning, pulses 96 will be applied through an amplifier 97 to the control grid of the output gate 89 whose output circuit is connected over conductor 98 with the control grid 10 of the sending distributor 6. This will cause the ringing of the called line over distributor 6, because the suppressor grid of 89 is opened when the beam of distributor 5 sweeps the dynode of the called line.

The group and units registers are conventional trigger circuits connected as binary counters and arranged to receive and store five different digits representing the group or tens designations of the called lines. Obviously, provision may be made for any other grouping.

Each register comprises a pair of tubes such as 100, 101, 102, 103, 104, 105, 106 and 107, of which the even numbered tubes are normally conducting. The first group dial pulse 74 which arrives over conductor 75 will cause the #1 group register to flip conduction from tube 104 to tube 105. This in turn will apply a potential over conductor 108 to the control grid of a group selection tube 109 to make it conductive.

The next group dial pulse 74 arriving over conductor 75 will restore conduction to tube 105 which will cut-off the selection tube 109 and pass the pulse to group register #2 over conductor 110 making 107 conductive. A pulse will now be passed from the #2 group register over conductor 111 to operate group selection tube 112.

A third pulse 74 which arrives over conductor 75 will again cause the #1 group register to function and operate the group selection tube 109, the group selection tube 112 having been cut off in the meantime.

The fourth pulse 74 over conductor 75 restores both the #1 and the #2 group registers to normal but will be applied over conductor 113 to operate the #4 group register 114 (which is like the two other group registers). This group register in turn will operate over conductor 115 a group selection tube 116.

The fifth group dial pulse 74 arriving over conductor 75 again operates the #1 group register and there through the group selection tube 109.

It will be seen therefore that if the first or group digit is 1, then tube 109 is operated, if it is 2, then tube 112, if 3, then 109 and 112, if 4 then tube 116, and if 5, then tubes 116 and 109.

After the change-over controlled by elements 81 to 86, the units pulses 72 arriving over conductor 73 will affect the #1 and #2 units registers in the same manner as was described in connection with the group registers. Similarly, the units registers over conductors 117 and 118 will operate units selection tubes 119 and 120 in the same manner as the group selection tubes were operated under the control of the group registers. The two units registers and selection tubes make possible the selection of one out of four lines in each of the five groups.

Upon the completion of the dialing, the odd numbered tubes in certain of the registers will be conducting. If, for example, the called line #32 were dialed, then the #1 and #2 group registers and the #2 units register would be operated, operating in turn the group selection tubes 109 and 112 and the units selection tube 120.

The plates of these selection tubes are connected to common resistances 121 and 122, respectively. When one of the register trigger circuits is flipped to its operating condition, it will bias its associated selection tube to draw more current, and the amount of current drawn by the tube will depend upon the resistance in the cathode circuit of the tube and the positive bias applied to its grid. By properly adjusting the cathode resistors 123, 124, 125, 126 and 127 of the selection tubes, the current flowing through the tubes can be made to vary in interval steps. For example, the cathode resistor 123 of tube 109 may be adjusted, so that one milliampere of current will flow through the tube when positively biased, the resistor 124 so that two milliamperes will flow through the tube 112 when positively biased, and 125 so as to permit the flow of four milliamperes through tube 116 when its grid is positively biased. The current in the output circuit is applied over conductor 127 to control the operation of two electronic switching devices 128 and 228, two embodiments of which will now be described with reference to Figs. 5 and 6.

In the electronic switch of Figs. 6 and 7, a cathode 129 is heated by a filament 130 to emit electrons which are controlled by a grid 131. The electrons that pass through grid 131 are formed into a beam by anodes 132, 133 and 134. The beam is constrained to sweep along a circular path by means of the customary horizontal and vertical deflecting plates 135. The potentials are so adjusted as to direct the beam between the toroidal electrodes 136 and 137 of a condenser. The potentials on these condenser plates can be adjusted so that the beam will sweep in circles of any desired radius on a screen 138.

As shown in Fig. 6, the screen 138 has angularly and radially displaced cut-out segments 139, 140, 141 and 142. The dynodes 143 are aligned with the cut-outs. Secondary electrons deflected by the dynodes are picked up by a positively charged anode 144 which has extensions (not shown) operating as shields between the individual dynodes 143.

With the four cut-outs 139—142 in screen 138, the switch will have a time division of four. However, any other number of cut-outs may be provided.

The signal may be taken off the screen 138, the anode 144, or the dynodes 143. The potential applied to the grid 131 may be used to modulate the beam. The variations in dynode potential will modulate the anode 144 and, conversely, the variations in the potential applied to the anode 144 may be used to modulate the output of the dynodes 143 when the beam sweeps over them.

The switch may be used to afford time division in a multiplex system, the beam being rotated at the recurrence frequency. By adjusting the potential on the condenser plates 136 and 137, any channel may be chosen and connected with its assigned terminal 143, affording a two-way communication since the grid 131 may be used to modulate the dynode 143 and the dynode in turn can be used to modulate the anode 144.

If the number of channels is too great for separation within one tube, then two or more tubes may be connected in tandem. For example, the first monoscope would have a circular sweep frequency at the repetition rate and ten cut-outs dividing the time diameter into groups of ten. The output would be taken off the anode 144 and fed to the grid 131 of the next tube which sweeps at ten times the group frequency and also has ten cut-outs in its screen. By applying a potential on the toroidal condenser 136, 137 in each tube, the desired time channel can be selected.

If it is desired to mark the occurrence of any event in a cycle of the sweep frequency, this can be done in one or more of the tubes.

Two of the switches of the type shown in Fig. 6 are used in the registering and selecting circuit of Fig. 3, and will be referred to as group monoscope 128 and units monoscope 228. The monoscope 128 bears the same reference numerals as in Fig. 8, and the monoscope 228 the corresponding numerals in the two-hundreds.

The beam of the group monoscope 128 is deflected by integral steps to give the correct timing pulse period. The beam of the units monoscope 228 is rotated at 50,000 times per second. The screen 238, which serves also as an anode, is divided into segments of one-quarter the total so that four deflection voltages will give four different input signals. These signals are transferred from the dynode 243 of the units monoscope to the grid 131 of the group monoscope 128 which is rotated at 10,000 times per second and as five time divisions. During each of these time divisions, the four units time divisions of monoscope 228 can be transmitted. Hence, if proper voltage is applied to the toroidal condenser plates 136, 137 and 236, 237, any desired group and units selection can be performed.

Pulses 145 produced in the dynode 143 of the group monoscope 128 are applied to the grid of an inverter and cathode follower 146. The anode output of 146 is applied over conductor 147 to the suppressor grid of a pentode 148 controlling the tripping of the ringing current by allowing the passage of a pulse through tube 169 to the control grid of the ringing gate 93.

When the called subscriber answers, pulses will be generated in the circuits associated with the receiving tube 6 in substantially the same manner as described in connection with the initiation of the call. These pulses are then passed through the cathode follower and inverter 19 to the clipper amplifier 20, cathode follower 24 and then from the cathode of 24 over conductor 149 to the control grid of the trip ringing tube 148. The negative pulse appearing in the output circuit of the trip ringing tube 148 transfers conduction in the ringing control circuit to tube 92 and biases the ringing gate 93 to cut-off. The application of the ringing current from the oscillator 94 is thus stopped and the subscribers are ready to talk.

The cathode output of the inverter and cathode follower 146 is applied over conductor 150 to a busy pulse shaper 151 and there through to the grid of a busy gate 152 to cancel positive pulse 23 by a negative pulse 153, thus to prevent a second line finder gate like 26 from operating when the called line answers.

The pulses on conductor 150 are applied also to the control grid of the output gate control tube 51. This tube controls the suppressor grids of the input gate 48 and output gate 49.

A two-way talking circuit is now established between the calling and called lines. From the called subscriber's line, voice modulated signals are passed through the receiving distributor 5, the cathode follower and inverter 19, clipper 52, cathode follower 55, conductor 56, to the control grid of the input gate 47. Whenever the suppressor grid of this input gate is opened by the control tube 46, the pulse is passed through the gate 47 and a low pass filter 154 to the control grid of output gate 49. When the control tube 51 opens the output gate, the pulse is passed through amplifier 97, the output gate 89 and conductor 98 to the grid 10 of the sending distributor 6, whose beam is at this instant on the dynode in which the called line terminates. In the called line the modulated pulse goes through hybrid coil 4 to operate the receiver in the subset.

The path of the modulated speech signals from the calling subscriber's line to the called line is the same as above described, except that the signal is fed through input gate 48 and a low pass filter 155 to the control grid of the output gate 50.

Upon the termination of a call, when the calling subscriber hangs up the various circuit elements are released under the control of the delayed gain tube 37. The register circuit and the dial gates which are locked-in are released under the control of tubes 156, 157 and 158. The tube 156 is normally conducting. When the calling subscriber starts to call, the delayed gain tube transmits through its cathode and a conductor 159 a pulse to the grid of release control tube 157 and through the plate thereof to the grid of 156 to operate the latter for the duration of the call. When the calling subscriber hangs up at the end of the conversation, tube 157 again operates and applies a negative pulse to the grid of the release tube 158 which, by sending a positive pulse over conductor 160 and the conductors 161 and 162 connected therewith, will release all registers and storing circuits to normal. The link is now ready for the transmission of a new call.

What I claim is:

1. In a communication system, a plurality of lines, a plurality of links, means for selecting a link upon the initiation of a call on a line, distributor means for cyclically connecting the lines with the selected link, a signal repeater, means controlled over the calling line and the repeater for selecting a called line, means for transmitting through said repeater signals to and from the calling and called lines over the distributor means, means including signals from the calling line for controlling the selecting of the called line, and means including a multi-position electronic switch variably operable in accordance with the last mentioned selecting operation.

2. The system according to claim 1, and in which the electronic switch comprises a cathode ray tube having means for producing a beam of electrons, beam deflecting means and a plurality of electrodes on which the beam may impinge, and a circuit for the deflecting means controlled by the last mentioned selecting operation.

3. The system according to claim 1, a source of ringing current, and means for connecting it with the called line controlled by said electronic switch.

4. The system according to claim 1, a source of ringing current, means for connecting it with the called line, and means controlled by the electronic switch for disconnecting it from the called line.

5. The system according to claim 1, and a circuit for actuating the repeater controlled by said electronic switch.

6. The system according to claim 1, and means for preventing the selection of a link when the called line answers controlled by the electronic switch.

7. In a communication system, a plurality of lines divided into groups, a plurality of links, means for selecting a link upon the initiation of a call on a line, distributor means for cyclically connecting the lines with the selected link, a signal repeater, means controlled over the calling line and the repeater for selecting a desired group and an individual line therein, means for transmitting through said repeater signals to and from the calling and called lines over the distributor means, means including signals from the calling line for controlling the desired selecting operations, and means including a multi-position electronic switch variably operable in accordance with the selecting operations.

8. The system according to claim 7, in which said switch comprises a cathode ray tube having a beam, and means for deflecting the beam in accordance with a selecting operation.

9. In a communication system, a plurality of lines divided into groups, a plurality of links, means for selecting a link upon the initiation of a call on a line, distributor means for cyclically connecting the lines with the selected link, a signal repeater, means controlled over the calling line and the repeater for selecting a desired group and an individual line therein, means for transmitting through said repeater signals to and from the calling and called lines over the distributor means, means including signals from the calling line for controlling the desired selecting operations, two cathode ray tubes having beams, means for deflecting the beam of one tube in accordance with the group selecting operation, and means for deflecting the beam of the other tube in accordance with the individual line selecting operation.

10. In a telephone system, a plurality of lines divided into groups, a plurality of links, electronic distributor means connecting said lines cyclically with said links, electronic means for selecting a link upon the initiation of a call on a line, an electronic signal repeater, electronic register means controlled over the calling line and the repeater for selecting a desired group and an individual line therein, electronic means for transmitting through said repeater selecting and speech signals to and from the calling and called lines over the distributor means, means including a signal controller associated with the calling line for producing a series of impulses to control the group selecting and a second series of impulses to control the individual line selecting operation of the register, two cathode ray tubes each having an electron beam and controlling means for moving it into any one of a plurality of positions, a circuit for the controlling means of one tube variably operated in accordance with the group selecting operation of the register, and a circuit for the controlling means of the other tube variably operated in accordance with the individual line selecting operation of the register.

11. The telephone system according to claim 10, and a grid for controlling the beam of the first tube controlled by the beam of the second tube.

12. The telephone system according to claim 10, and a circuit for the repeater controlled by the beam of the first tube.

13. The system according to claim 10, electronic ring means, and a circuit for the ringing means controlled by the beam of the first tube.

14. The system according to claim 10, electronic ringing means, and means jointly controlled by the register and the first tube for controlling the connection of the ringing means with the called line.

15. In a telephone exchange system, a plurality of lines divided into groups, a plurality of links, means for connecting a calling line with a link, a dial associated with each line for dialing pulses representing the group to which the called line belongs and also a series of impulses representing the desired individual called line, group and units registering means associated with the selected link responsive to the two series of impulses, a group monoscope responsive to the setting of the group register, a units monoscope responsive to the setting of the units register, and means jointly controlled by the two monoscopes for establishing a talking circuit between the calling and called lines at predetermined periods of time.

16. The system according to claim 15, and means jointly controlled by the two monoscopes for ringing the called line.

17. In a telephone exchange system, a plurality of lines divided into groups, a dial associated with each line and arranged to produce a series of impulses representing the group designation and a second series of impulses representing the units designation of the desired called line, two electronic registers at the central exchange responsive, respectively, to the first and to the second series of pulses, electronic means for successively associating said registers with the calling line, an operating circuit for the group register and electronic means for actuating it in accordance with the group impulse, an operating circuit for the unit register and means for actuating it in accordance with the units impulses, and electronic means jointly controlled by the registers for selecting a called line.

18. In a telephone exchange system, a plurality of lines divided into groups, a dial associated with each line and arranged to produce a series of impulses representing the group designation and a second series of impulses representing the units designation of the desired called line, two registers at the central exchange responsive, respectively, to the first and to the second series of pulses, a controller for selectively and successively associating said registers with the calling line, said controller comprising a group and unit gate pentode and a group and unit digit control trigger circuit, an input circuit for applying pulses produced by the dial of the calling line to the control grids of the group and unit gate pentodes in multiple, an operating circuit for the group register connected with the anode of the group pentode, an operating circuit for the unit register connected with the unit pentode, means in the group trigger circuit for normally biasing the screen grid of the unit dial gate to cut-off and a screen grid of the group dial gate so that signals may pass therethrough, a multiple circuit for the suppressor grids of both pentodes controlled by the units trigger circuit, means for connecting said pulse input circuit with the group trigger circuit upon the termination of each series of dial pulses, and means for operating the units trigger circuit controlled by the group trigger circuit.

DAVID H. RANSOM.

REFERENCES CITED

The following references are of record in the file of this patent:

UNITED STATES PATENTS

| Number | Name | Date |
|---|---|---|
| 2,263,369 | Skillman | Nov. 18, 1941 |
| 2,266,671 | Wolf | Dec. 16, 1941 |
| 2,379,715 | Hubbard | July 3, 1945 |
| 2,387,018 | Hartley | Oct. 16, 1945 |